United States Patent [19]
Kumagai et al.

[11] Patent Number: 5,462,172
[45] Date of Patent: Oct. 31, 1995

[54] NONFERROUS MATERIAL SORTING APPARATUS

[75] Inventors: Masakatsu Kumagai, Aichi; Yoshihisa Fujita, Saitama, both of Japan

[73] Assignees: Toyota Tsusho Corporation; Toyota Metal Co., Ltd., both of Nagoya; Senko Kogyo Co., Ltd., Tokyo, all of Japan

[21] Appl. No.: 216,417

[22] Filed: Mar. 23, 1994

[30] Foreign Application Priority Data

Mar. 31, 1993 [JP] Japan .................. 5-098640

[51] Int. Cl.$^6$ .................. B03B 4/00; B07B 9/00; B07B 13/00
[52] U.S. Cl. .................. 209/12.1; 209/44; 209/212; 209/294; 209/472; 209/479
[58] Field of Search .................. 209/12.1, 40, 44, 209/212, 294, 466, 467, 471, 472, 696, 479

[56] References Cited

U.S. PATENT DOCUMENTS

| | | | |
|---|---|---|---|
| 2,291,042 | 7/1942 | Kennedy | 209/40 |
| 3,905,556 | 9/1975 | Drage | 209/44 X |
| 4,118,309 | 10/1978 | Myers et al. | 209/696 X |
| 4,387,019 | 6/1983 | Dale et al. | 209/44 X |
| 4,834,870 | 5/1989 | Osterberg et al. | 209/212 X |
| 4,971,684 | 11/1990 | Mueller | 209/467 X |

FOREIGN PATENT DOCUMENTS

| | | | |
|---|---|---|---|
| 0396529 | 11/1990 | European Pat. Off. | |
| 472242 | 2/1992 | European Pat. Off. | 209/12.1 |
| 0512229 | 11/1992 | European Pat. Off. | |
| 0524396 | 1/1993 | European Pat. Off. | |
| 2376703 | 8/1978 | France | |
| 3301978 | 7/1984 | Germany | |
| 57-102274 | 6/1982 | Japan | |
| 58-282 | 1/1983 | Japan | |
| 62-186957 | 8/1987 | Japan | |
| 4150959 | 5/1992 | Japan | |
| 5-57212 | 3/1993 | Japan | |
| 1585019 | 8/1990 | U.S.S.R. | 209/12.1 |

*Primary Examiner*—Michael S. Huppert
*Assistant Examiner*—Tuan N. Nguyen
*Attorney, Agent, or Firm*—Oblon, Spivak, McClelland, Maier & Neustadt

[57] ABSTRACT

A nonferrous material sorting apparatus comprises a screening device for screening nonferrous materials to be sorted into materials of a plurality of size ranges, a first sorting device for sorting the nonferrous materials of the minimum size range according to the weight ratio by an inclined vibrating air table supplied with air, and a second sorting device for sorting the nonferrous materials of the size range larger than the minimum size range according to the size in specific gravity of the nonferrous materials relative to constituent materials of a fluidized bed.

21 Claims, 12 Drawing Sheets

NONFERROUS MATERIAL SORTING APPARATUS

BACKGROUND OF THE INVENTION

1. Field of the Invention

This invention relates to a nonferrous material sorting apparatus which makes it possible to sort nonferrous materials in accordance with every three kinds or more of sizes.

2. Description of the Prior Art

Figure 12:
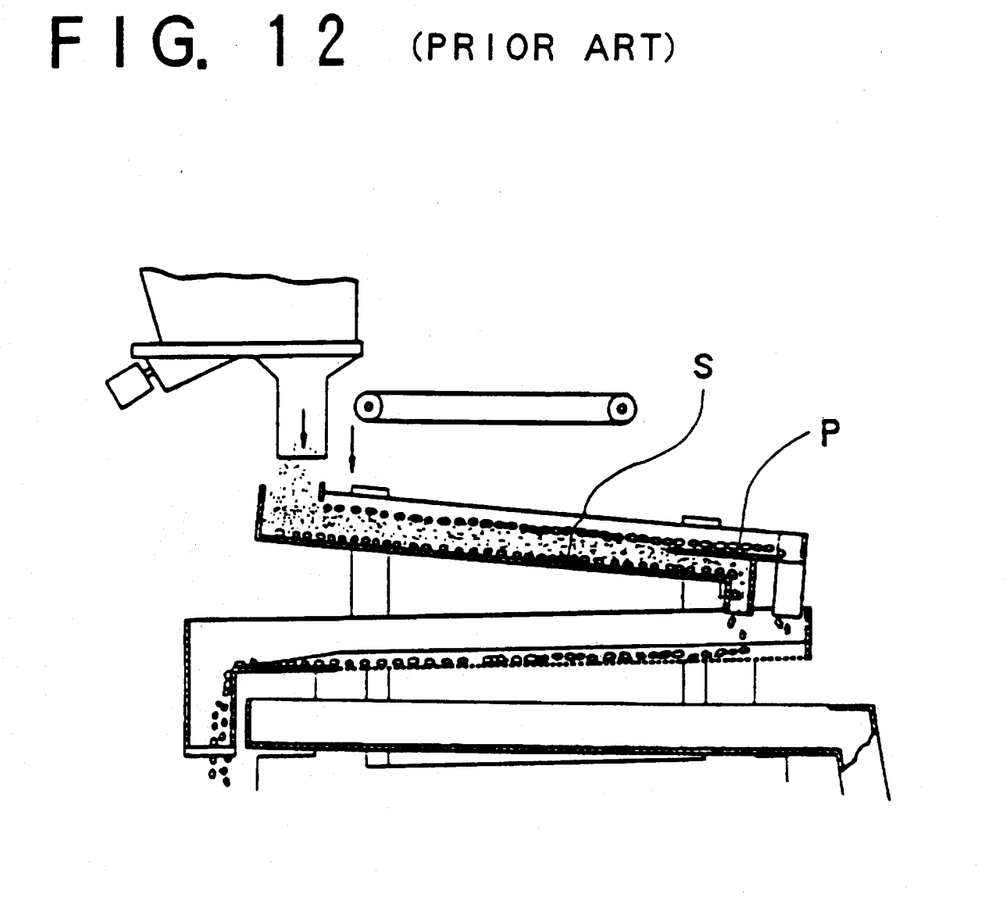
FIG. 12 is a block diagram showing a prior art nonferrous material sorting apparatus.

As shown in FIG. 12, a conventional nonferrous material sorting apparatus (Japanese Patent Laid-open No. 57-102274) is operated such that light copper pieces and heavy copper pieces constituting the materials to be sorted are mixed with powdery bodies constituting a fluidized bed used as media, and the light copper pieces lighter than the powdery bodies and the heavy copper pieces heavier than the powdery bodies are respectively sorted to an upper portion and a lower portion by a vibrated sorting deck S and a separation plate P, while making use of the difference in relative specific gravity between the materials to be sorted and the powdery bodies.

However, since the conventional apparatus described above is operated to sort the materials to be sorted to the upper and lower layers by the sorting deck S and the separation plate P due to the difference in relative specific gravity between the materials to be sorted and the powdery bodies constituting the fluidized bed used as media, it involves such a problem that the weight and size of the materials to be sorted are restricted by the weight and size of the powdery bodies. Further, since the resistance of the materials to be sorted settling through the powdery bodies is varied depending on the size of the materials to be sorted, it has been necessary to regulate the size of the materials to be sorted within a certain range. Thus, there has been such a problem that some materials to be sorted cannot be sorted by the conventional apparatus described above due to the kinds and sizes thereof.

SUMMARY OF THE INVENTION

An object of the present invention is to provide a nonferrous material sorting apparatus based on such a technical concept of the present invention that nonferrous materials to be sorted are screened into materials of a plurality of size ranges by a screening device, and the screened materials to be sorted are sorted by sorting devices having different principles in accordance with the size and weight of the screened materials to be sorted.

Another object of the present invention is to make it possible to sort all the materials to be sorted without being restricted by materials constituting a fluidized bed used as media.

A further object of the present invention is to make it possible to sort nonferrous materials to be sorted according to the size and weight of the materials to be sorted after being screened into the materials of a plurality of size ranges.

A still further object of the present invention is to sort nonferrous materials to be sorted with accuracy according to the kind of the materials to be sorted.

A yet further object of the present invention is to effectively promote the operation of sorting nonferrous materials to be sorted by removing factors obstructive to the sorting operation.

A yet further object of the present invention is to make it possible to sort out conductive metal from materials to be sorted.

A yet further object of the present invention is to make it possible to sort magnetic materials and dust getting mixed with materials to be sorted.

A yet further object of the present invention is to remove rubber-like elastic materials getting mixed with materials to be sorted.

A yet further object of the present invention is to provide a nonferrous material sorting apparatus comprising a first screening device for screening materials of not more than the minimum reference size, a first sorting device for sorting the materials screened by the first screening device according to the weight ratio by an inclined vibrating table supplied with air, a second screening device for,screening the materials into materials of at least two kinds of reference sizes larger than the minimum reference size described above, and a second sorting device for sorting the materials screened by the second screening device according to whether or not specific gravity of the screened materials is large relative to constituent materials of a fluidized bed.

A yet further object of the present invention is to provide a nonferrous material sorting apparatus further comprising a conductive metal sorting device for sorting out conductive metal from the light materials sorted by the first and second sorting devices described above using repulsive force based on an alternating magnetic field of a magnet rotor provided with a magnet.

A yet further object of the present invention is to provide a nonferrous material sorting apparatus further comprising an elastic substance removing device for removing rubber-like elastic materials, while making use of the elasticity and frictional coefficient of the rubber-like elastic materials by applying the vibration to the materials screened by the first screening device described above.

The nonferrous material sorting apparatus according to the present invention is operated such that the first screening device screens the materials of not more than the minimum reference size, the first sorting device sorts the materials screened by the first screening device according to the weight ratio by the inclined vibrating table supplied with air, the second screening device screens the materials into the materials of at least two kinds of reference sizes larger than the minimum reference size described above, and the second sorting device sorts the materials screened by the second screening device according to whether or not specific gravity of the screened materials is large relative to the constituent materials of the fluidized bed.

In addition to the operation described above, the nonferrous material sorting apparatus according to the present invention is operated such that the conductive metal sorting device sorts out the conductive metal from the light materials sorted by the first and second sorting devices due to the repulsive force based on the alternating magnetic field of the magnet rotor.

Further, in addition to the operation described above, the nonferrous material sorting apparatus according to the present invention is operated such that the elastic substance removing device removes the rubber-like elastic materials from the materials of the minimum reference size screened by the first screening device, while making use of the elasticity and frictional coefficient of the rubber-like elastic materials by applying the vibration to the rubber-like elastic materials.

The nonferrous material sorting apparatus of the present invention having the operation described above has the effect of making it possible to sort all the materials to be sorted without being restricted by the materials constituting the fluidized bed used as media, since the materials to be sorted can be sorted according to different material sorting processes depending on a plurality of reference sizes.

Further, in addition to the effect described above, the nonferrous material sorting apparatus of the present invention having the operation described above has the effect of making it possible to sort out the conductive metal.

Furthermore, in addition to the effects described above, the nonferrous material sorting apparatus of the present invention having the operation described above has the effect of making it possible to remove the rubber-like elastic materials.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

As shown in FIGS. 1 to 8, a nonferrous material sorting apparatus as a first preferred embodiment of the present invention comprises a first screening device 1 for screening materials of not more than 12 mm, a first sorting device 2 for sorting the materials screened by the first screening device 1 according to the weight ratio by an inclined vibrating air table 20 supplied with air, a second screening device 3 for screening the materials into materials of 12 to 20 mm, those of 20 to 35 mm, and those of not less than 35 mm and a second sorting device 4 for respectively sorting the materials of 12 to 20 mm and those of 20 to 35 mm screened by the second screening device 3 according to the size in specific gravity of the screened materials relative to constituent materials of a dry fluidized bed.

Figure 1:
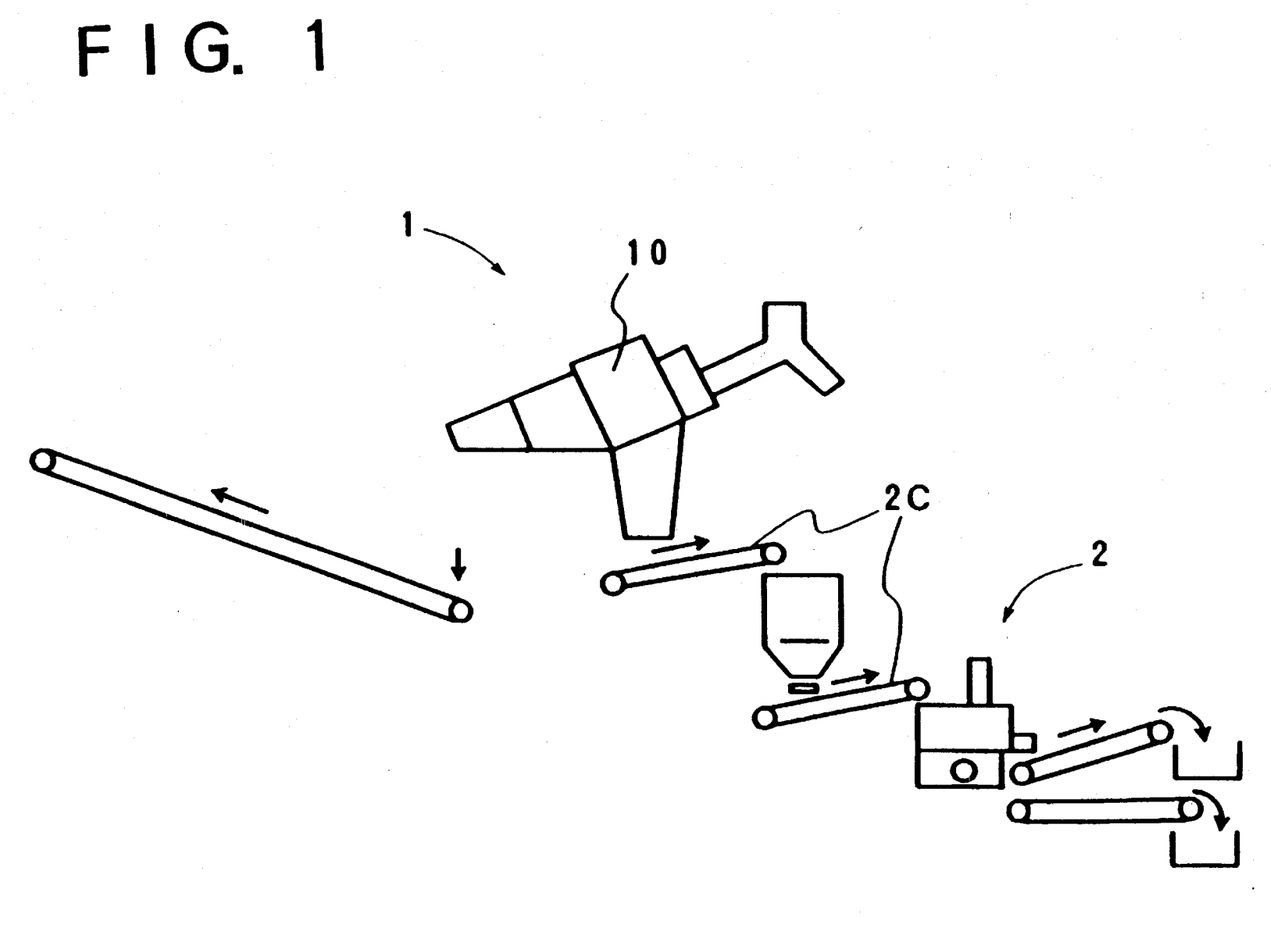
FIG. 1 is a block diagram showing a nonferrous material sorting apparatus as a first preferred embodiment of the present invention.
Figure 2:
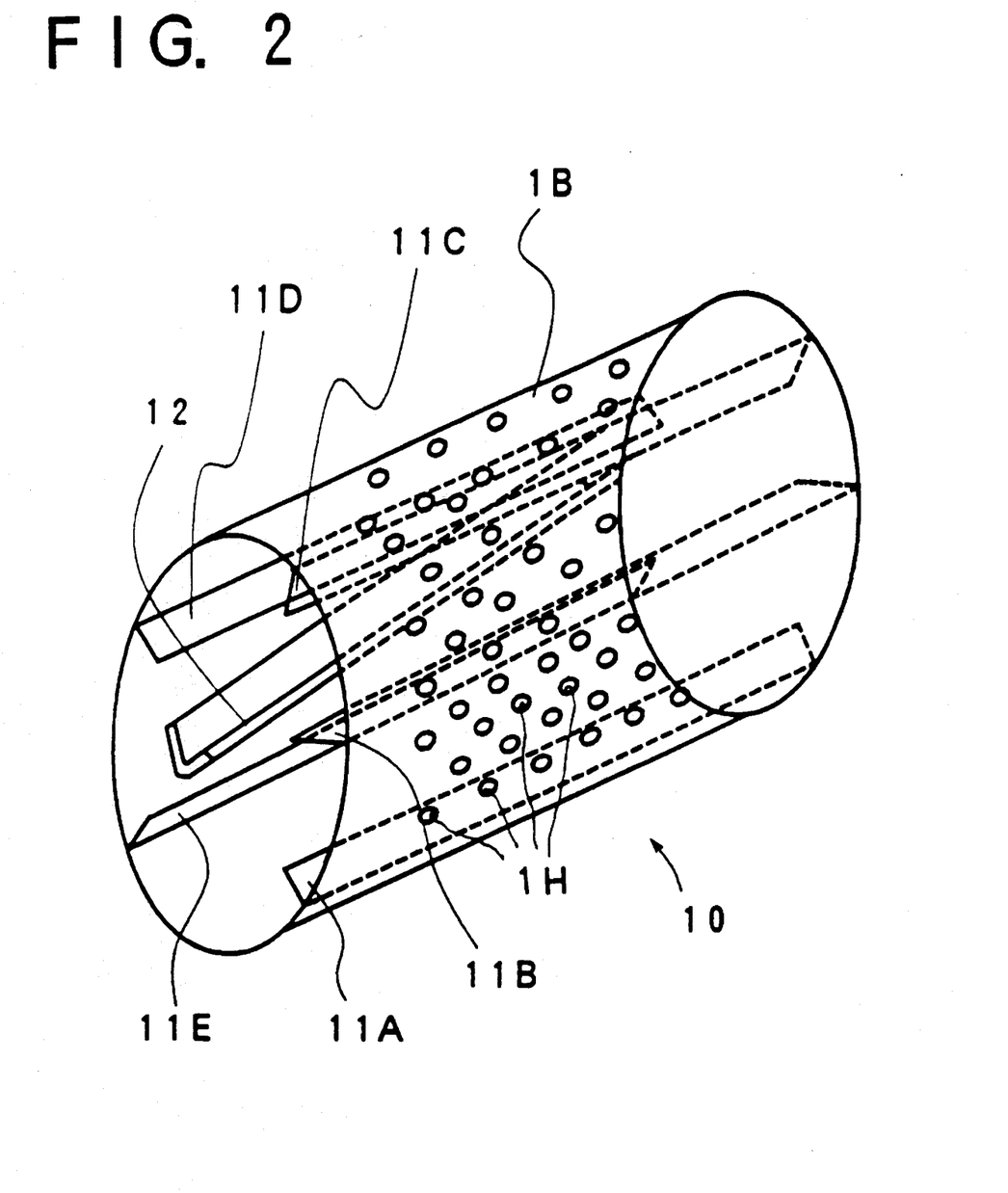
FIG. 2 is a perspective view showing a trommel of a first screening device.
Figure 3:
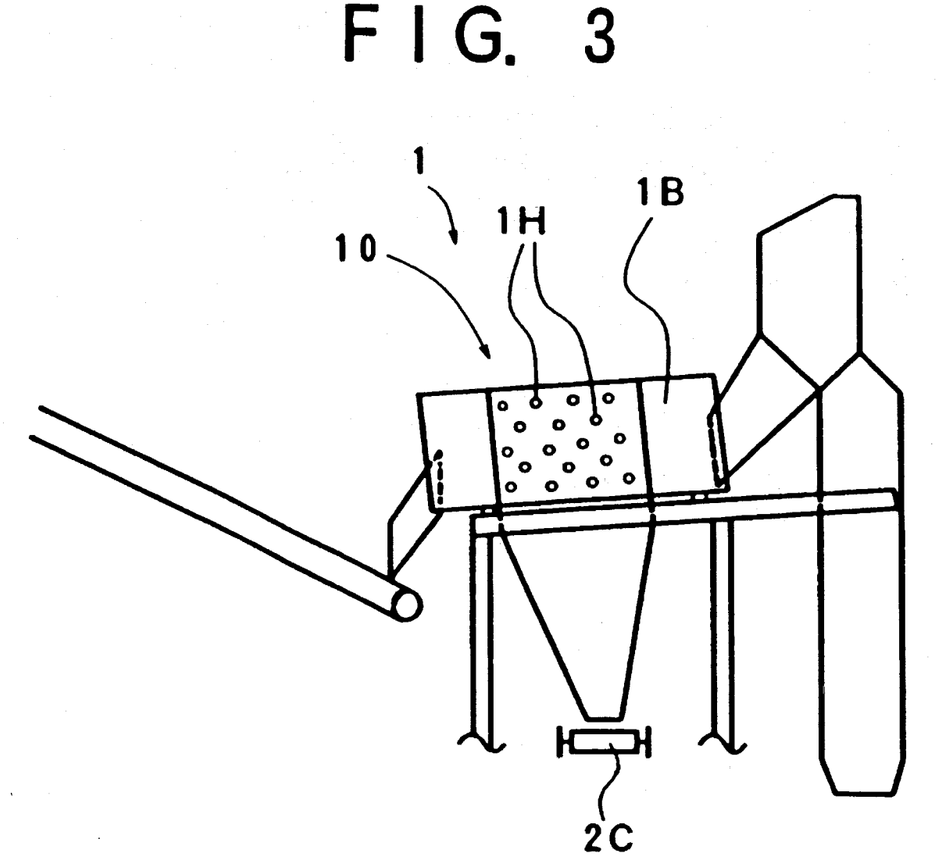
FIG. 3 is a side view showing the first screening device.

As shown in FIGS. 1 to 3, the first screening device 1 is composed of a trommel 10 having a rotationally-driven hollow cylindrical body 1B arranged with an inclination to a horizontal plane. The hollow cylindrical body 1B has a plurality of holes each having an inner diameter of 12 mm and bored in the side wall, five scrapers 11A to 11E arranged to be approximately perpendicular to the inside wall surface at intervals of 72° and provided in the axial direction, and one scraper 12 having an L-shaped section and formed on the inside wall with an inclination in the axial direction. The nonferrous materials of not more than 12 mm among the supplied nonferrous materials are dropped from the holes 1H bored in the side wall through the rotation of the hollow cylindrical body 1B, while the nonferrous materials stayed by the scrapers 11A to 11E and 12 are dropped when being rotated up to a certain angle. Therefore, the first screening device 1 is constituted to make it possible to screen the materials of not more than 12 mm by effectively dropping the smallest materials from the holes 1H.

Figure 4:
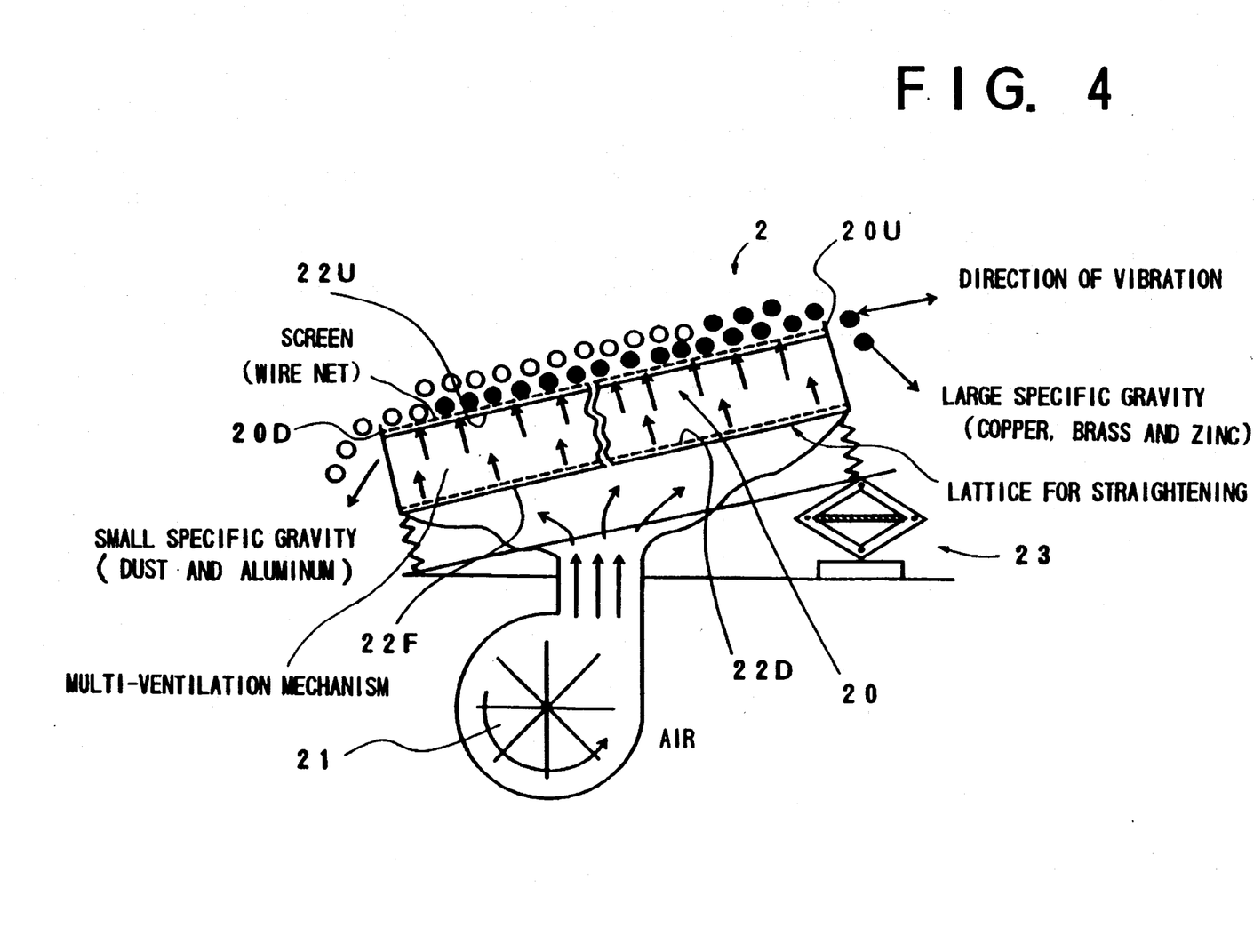
FIG. 4 is a sectional view showing a first sorting device.

The first sorting device 2 is composed of an air table 20 having a frame body 22F vibrated by a vibrating mechanism (not shown) in the lateral direction in FIG. 4 (upwards in the inclined direction) and supported by coil springs at both ends to be arranged with an inclination at an angle adjusted by an inclination adjuster 23. The frame body 22F has upper and lower screens 22U and 22D respectively arranged at upper and lower portions of the frame body and constituting a rectifying lattice having rectangular holes for rectifying the air supplied from an air blower 21 as shown in FIG. 4 to cause the rectified air to act on the screened nonferrous materials of not more than 12 mm supplied from the first screening device 1 through conveyers 2C.

The air table 20 is constituted to make it possible that the substance such as aluminum and dust having a small specific gravity (indicated by dots in Figure) is located to an upper portion by the rectified air blown off from the screens 22U and 22D, then moved downwards due to the inclination of the air table, and dropped from a lower end 20D, while the substance such as copper, brass and zinc having a large specific gravity (indicated by black dots in Figure) is located to a lower portion contacting the screen due to its own weight, then moved upwards by the vibration of the screen 22U, and dropped from an upper end 20U.

Figure 5:
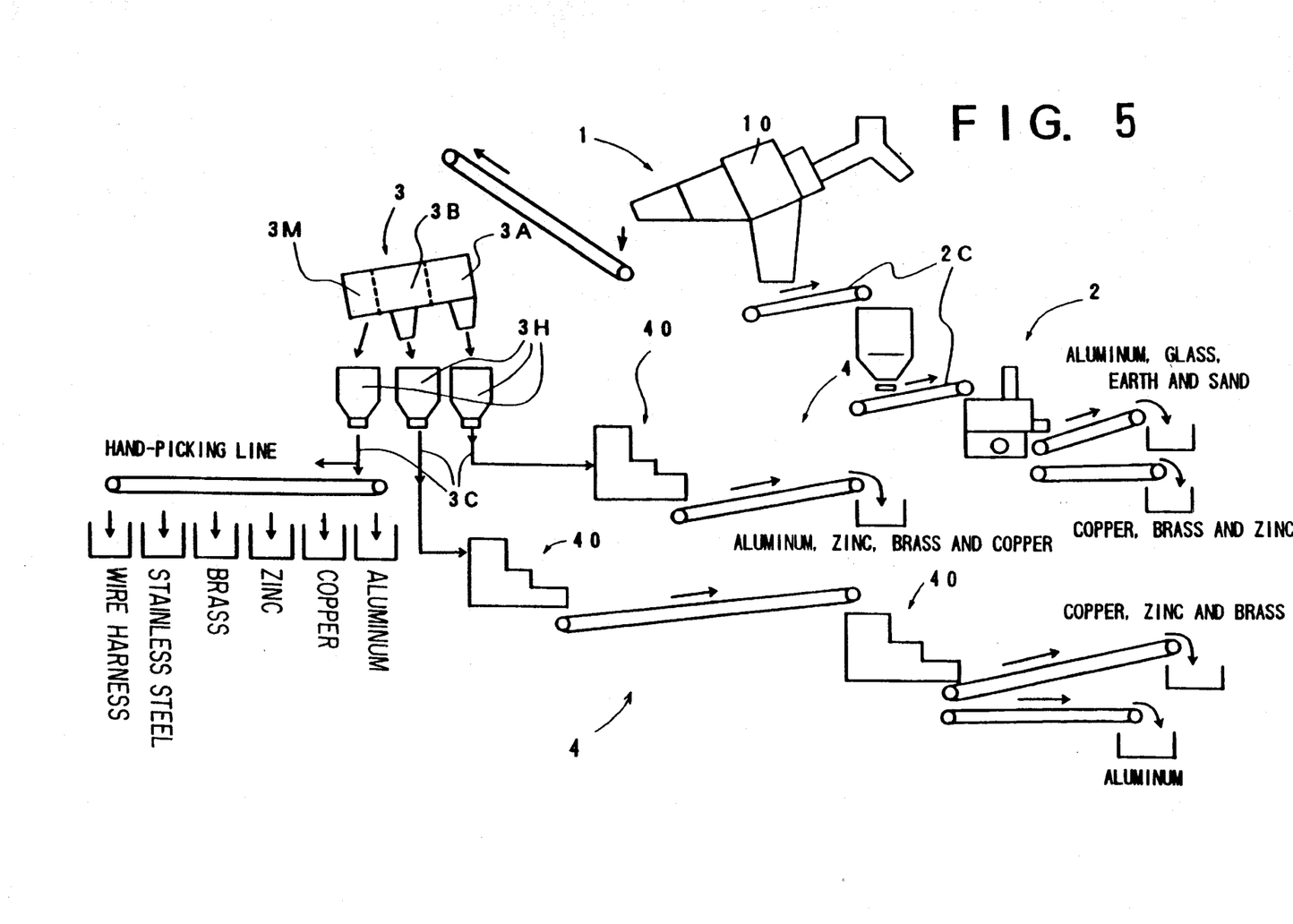
FIG. 5 is a block diagram showing a second screening device and a second sorting device.
Figure 6:
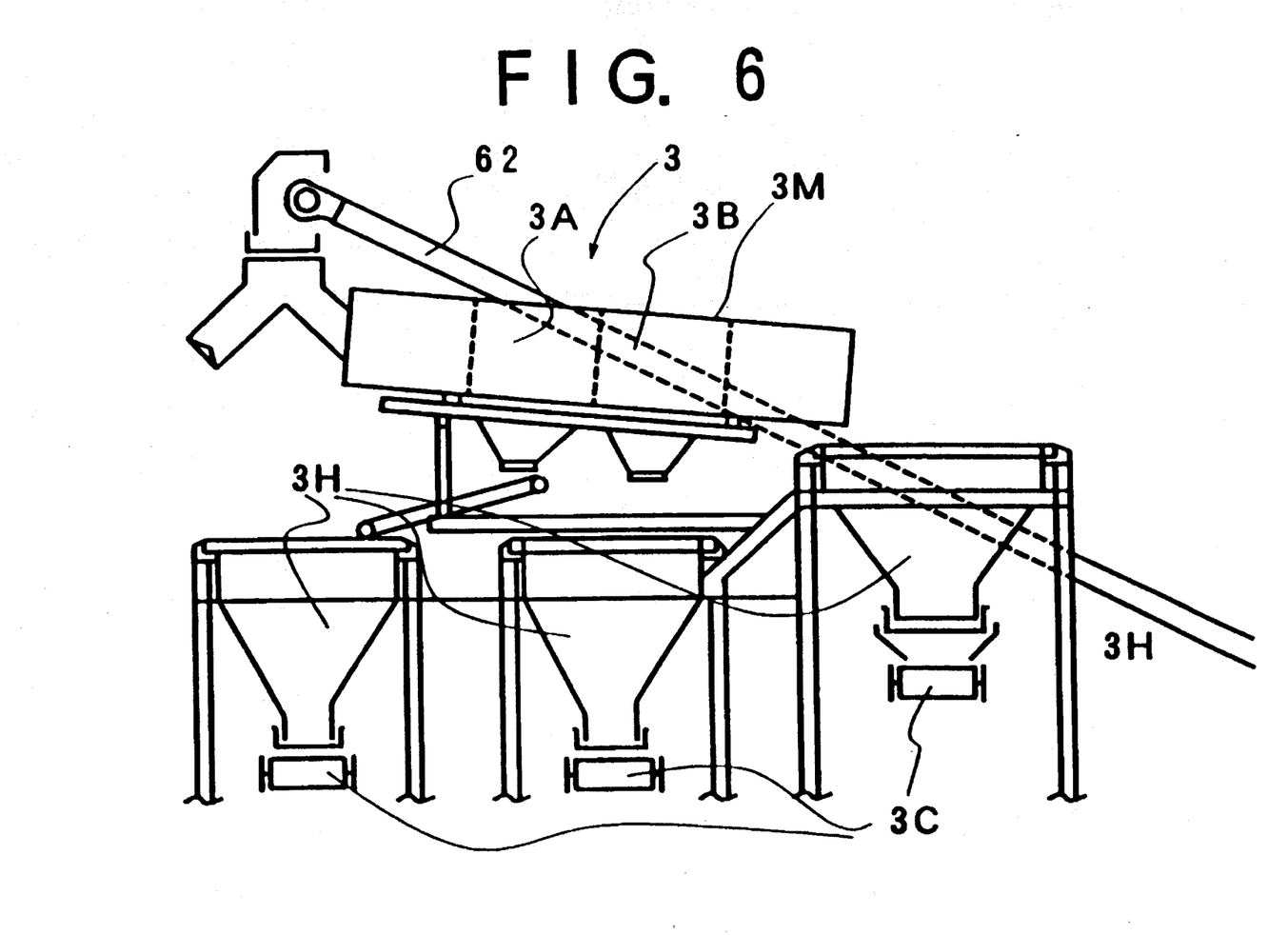
FIG. 6 is a side view showing the second screening device.
Figure 7:
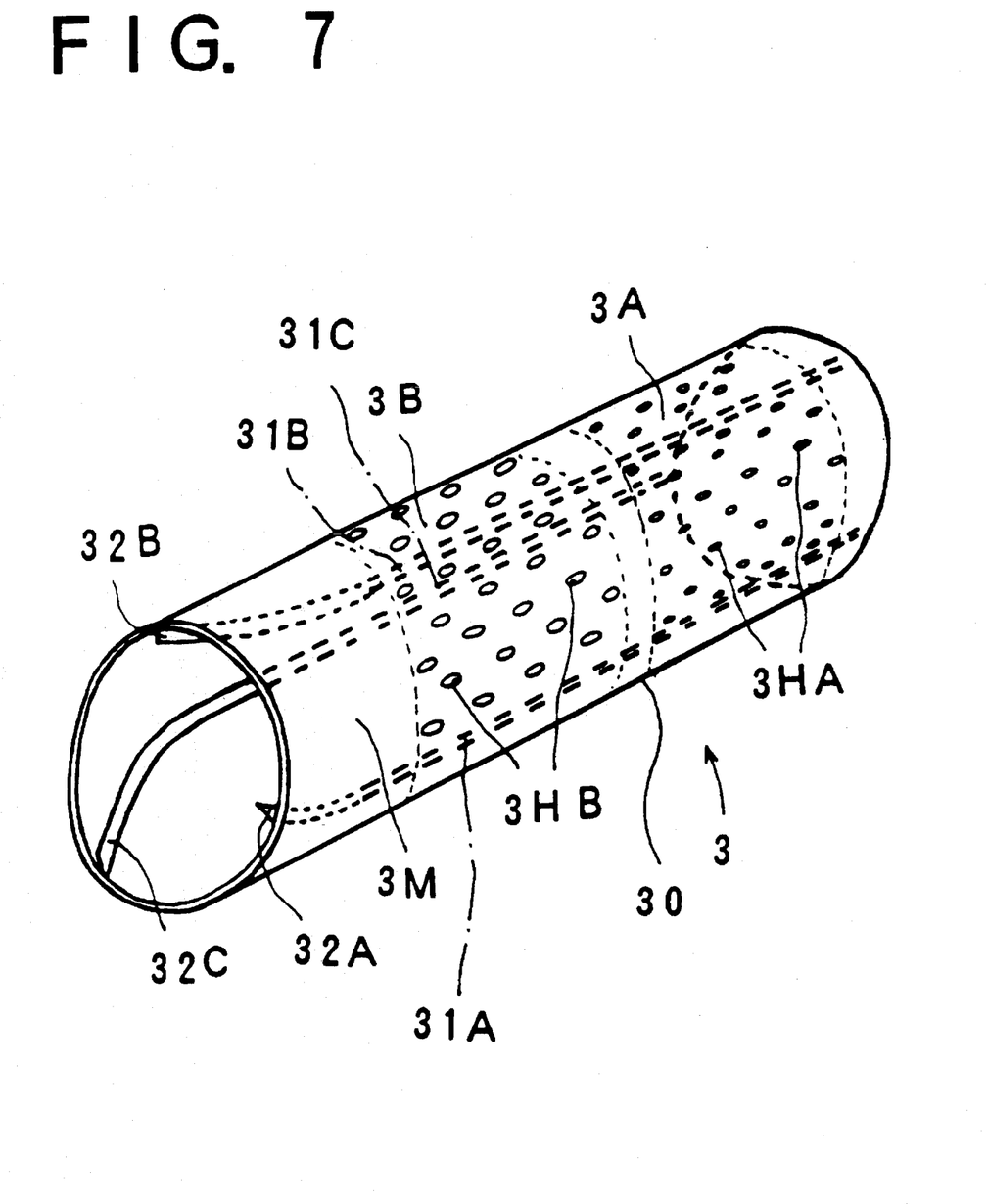
FIG. 7 is a perspective view showing a trommel of the second screening device.
Figure 8:
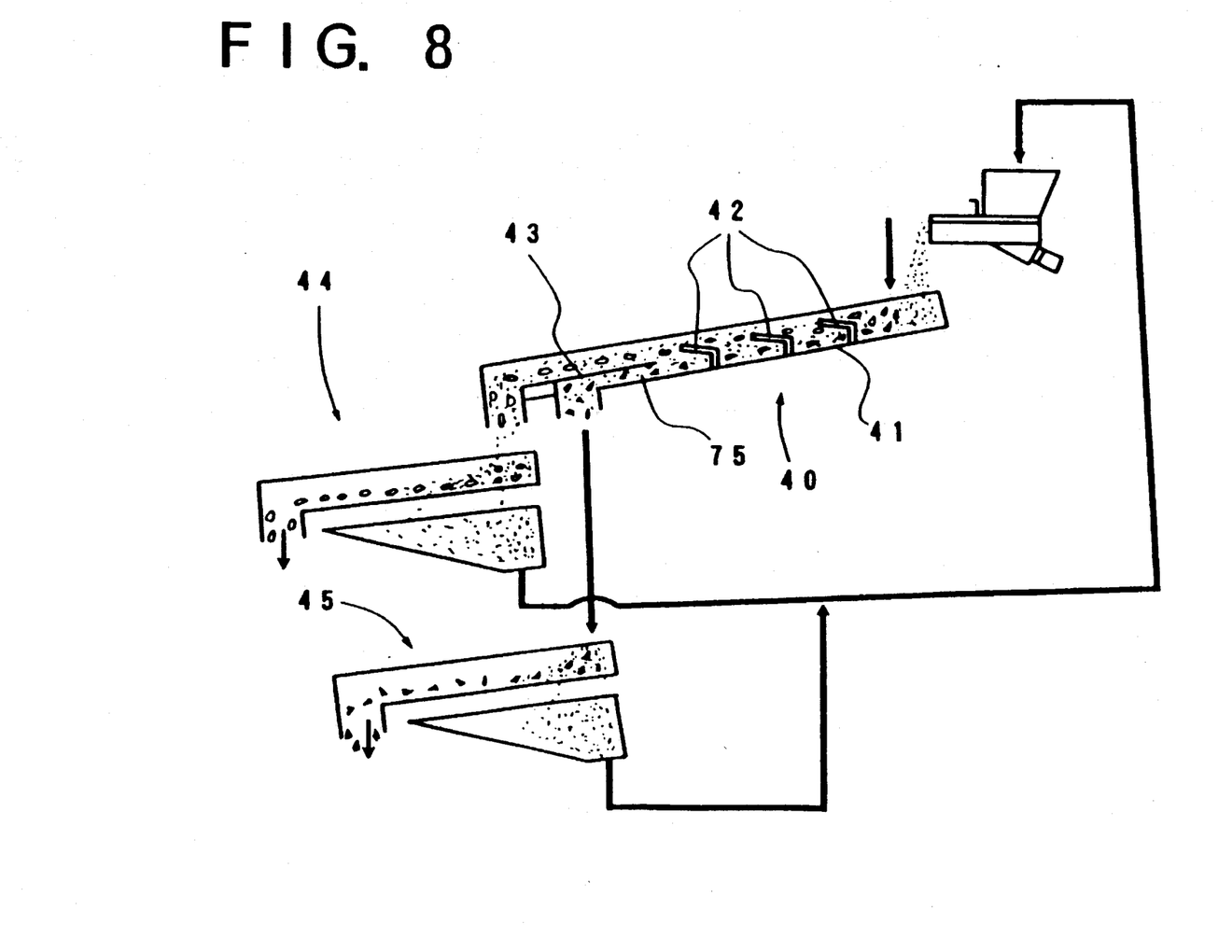
FIG. 8 is a block diagram showing the second sorting device.

As shown in FIGS. 5 to 7, the second screening device 3 is composed of a trommel 30 having a rotationally-driven hollow cylindrical body 3M arranged with an inclination to a horizontal plane. The hollow cylindrical body 3M has a first area 3A formed at an upper portion of the side wall and having holes 3HA respectively having inner diameters of 12 to 20 mm, a second area 3B formed on the downstream of the first area 3A and having holes 3HB respectively having inner diameters of 20 to 35 mm, and three scrapers 31A to 31C integrally arranged on the inside wall at intervals of 120° in the axial direction. The lower ends of the scrapers 31A to 31C are respectively formed into doglegged portions 32A to 32C in order to facilitate the discharge. The nonferrous materials of 12 to 20 mm and those of 20 to 35 mm are dropped from the holes of the respective sizes bored in the side wall through the rotation of the hollow cylindrical body 3M, while the nonferrous materials stayed by the scrapers 31A to 31C without being dropped through the rotation described above are dropped downwards when being rotated up to a certain angle. Therefore, the second screening device 3 is constituted to make it possible to drop the materials of 12 to 20 mm and those of 20 to 35 mm from the holes 3HA and 3HB, while discharging the finally remaining nonferrous materials of not less than 35 mm from the doglegged portions 32A to 32C.

As shown in FIGS. 5 to 8, the second sorting device 4 is composed of a dry fluidized bed sorting device 40 having a sorting deck 41 arranged with an inclination to make an eccentric motion as a vibrating motion and having a gradually tapered area on the downstream side. The sorting deck 41 has a large number of separation promoting pieces 42 planted on the bottom and composed of doglegged members bent to the downstream side. The dry fluidized bed sorting device 40 is arranged to make it possible that the screened nonferrous materials of 12 to 20 mm and those of 20 to 35 mm supplied from the second screening device 3 through hoppers 3H and a conveyer 3C are mixed with sand constituting the fluidized bed used as circulating media, the resultant mixture is supplied to the sorting deck 41, the heavy substance such as copper, zinc and brass having a specific gravity larger than that of the sand is settled through the fluidized bed composed of the sand to provide deposits (indicated by black dots in Figure), the light substances such as aluminum, glass, earth and sand and rubber having a specific gravity smaller than that of the sand is floated through the fluidized bed of the sand to provide flotages (indicated by dots in Figure), the deposits and flotages are separated from each other by a separation plate 43 arranged on the downstream side, and each of the deposits and flotages is further separated from the sand constituting the fluidized bed by sifting devices 44 and 45 in the downstream, respectively. The separated sand is returned to the upstream and then circulated.

In the nonferrous materials of 20 to 35 mm, the materials separated as the deposits by the dry fluidized bed sorting device 40 described above are further separated into deposits of copper, zinc and brass or the like and the flotages of aluminum or the like by a similar dry fluidized bed sorting device 40 having a fluidized bed composed of converter air crushed slag heavier than the sand.

The nonferrous materials of not less than 35 mm discharged from the doglegged portions 32A to 32C of the scrapers 31A to 31C are sorted every material kind by the color and weight in hand-picking line or automation line. According to the nonferrous material sorting apparatus constituted as described above, the supplied nonferrous materials to be sorted can be sorted as follows. Firstly, the nonferrous materials not more than 12 mm are screened by the trommel 10 of the first screening device 1, and further sorted into the light substance such as aluminum and dust having a small specific gravity and the heavy substance such as copper, zinc and brass having a large specific gravity by the air table 20 of the first sorting device 2. The nonferrous materials of not less than 12 mm screened by the trommel 10 of the first screening device 1 are screened into three kinds of materials, i.e., the materials of 12 to 20 mm, those of 20 to 35 mm and those of not less than 35 mm by the trommel 30 of the second screening device 3. The nonferrous materials of 12 to 20 mm and those of 20 to 35 mm are sorted into the deposits of copper, zinc and brass or the like and the flotages of aluminum or the like due to the separation plate 43 and the size in specific gravity of the materials to be sorted relative to the sand constituting the fluidized bed by the sorting deck 41, which is planted with the separation promoting pieces 42 and makes an eccentric motion, in the dry fluidized bed sorting device 40. The nonferrous materials of 20 to 35 mm are further sorted into the deposits and flotages by the dry fluidized bed sorting device 40 having the fluidized bed composed of the converter air-crushed slag, similarly to the case described above.

Since the nonferrous materials of not more than 12 mm are sorted by the air table 20, and the nonferrous materials of 12 to 20 mm and those of 20 to 35 mm are sorted by the dry fluidized bed sorting device 40 so that the sorting operation is carried out by the sorting devices having different principles in accordance with the size of the materials to be sorted without being restricted by the fluidized bed used as media, the nonferrous material sorting apparatus as the first preferred embodiment having the operation described above has the effect of making it possible to sort all the materials to be sorted.

Further, since the doglegged separation promoting pieces 42 bent to the downstream side are planted on the sorting deck 41 of the dry fluidized bed sorting device 40 in the second sorting device 4, the nonferrous materials sorting apparatus as the first preferred embodiment has the effect of making it possible to promote the eccentric motion of the sand used as media so as to effectively cause the settlement and floating of the materials to be sorted, while catching the loop-like materials by the separation promoting pieces 42 to prevent the loop-like materials from obstructing the operation described above.

A nonferrous material sorting apparatus as a second preferred embodiment comprises a conductive metal sorting device 5 as will be described in the following, in addition to the first preferred embodiment described above.

Figure 9:
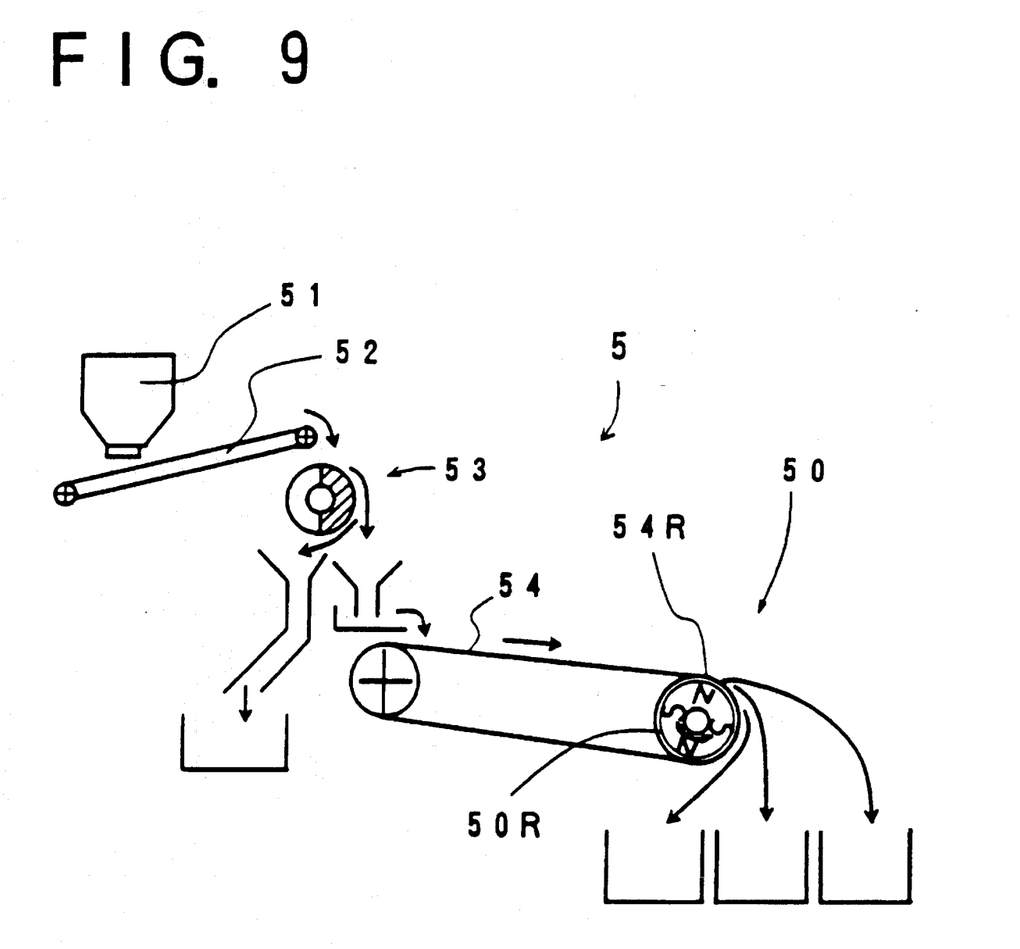
FIG. 9 is a block diagram showing a conductive metal sorting device of a nonferrous material sorting apparatus as a second preferred embodiment of the present invention.

As shown in FIG. 9, the conductive metal sorting device 5 is provided for further sorting the small specific gravity substance sorted by the air table 20 and the materials mainly consisting of aluminum and glass or the like sorted by the dry fluidized bed sorting device 40. The materials reserved in a hopper 51 are supplied to a rotary magnet 53 through a belt conveyer 52, and magnetic materials are sorted out by the rotary magnet 53 in advance, while the materials which cannot be sorted by the rotary magnet 53 are supplied to an eddy-current sorting device 50 through a belt conveyer 54.

The eddy-current sorting device 50 is composed of a magnet rotor 50R arranged to be coaxial with a rotor 54R for belt on the downstream side of the belt conveyer 54 and having alternately-arranged N and S poles of a rare earth magnet. The magnet rotor 50R is constituted to be rotationally driven not only in the same direction as the rotor 54R but also in the reverse direction. The materials supplied through the belt conveyer 54 are sorted such that the conductive metal is sent away to the farthest position due to the repulsive force caused by eddy-current generated in the conductive metal based on an alternating magnetic field of the magnet rotor 50R, the magnetic materials are dropped directly below because of the adsorption to the magnet, and the dust is naturally dropped due to the own weight to the position between the conductive metal and the magnetic materials. Thus, the eddy-current sorting device 50 is constituted to make it possible to sort the materials by controlling the dropping position according to the kind of the materials.

The nonferrous material sorting apparatus as the second preferred embodiment constituted as described above has the effect of making it possible to sort out the conductive metal, while sorting out the magnetic materials and dust getting mixed with the supplied materials.

A nonferrous material sorting apparatus as a third preferred embodiment is suitable for a case where a rubber-like elastic substance of rubber, urethane or the like such as crushed materials of an automobile is contained in the nonferrous materials to be sorted. This nonferrous material sorting apparatus further comprises an elastic substance removing device 6 provided between the first screening device 1 and the second screening device 3 of the apparatus as the second preferred embodiment.

Figure 10:
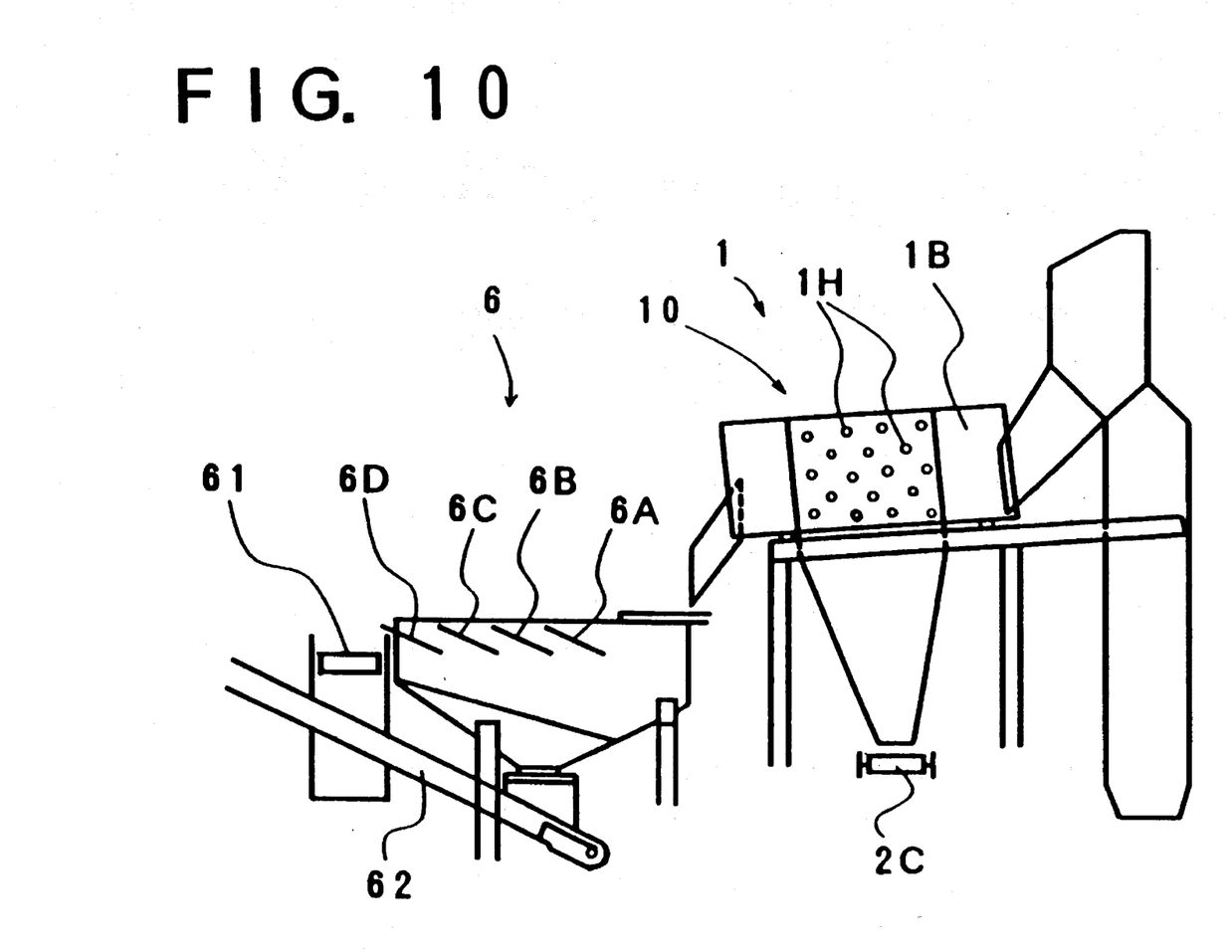
FIG. 10 is a block diagram showing a first screening device and an elastic substance removing device of a nonferrous material sorting apparatus as a third preferred embodiment of the present invention.
Figure 11:
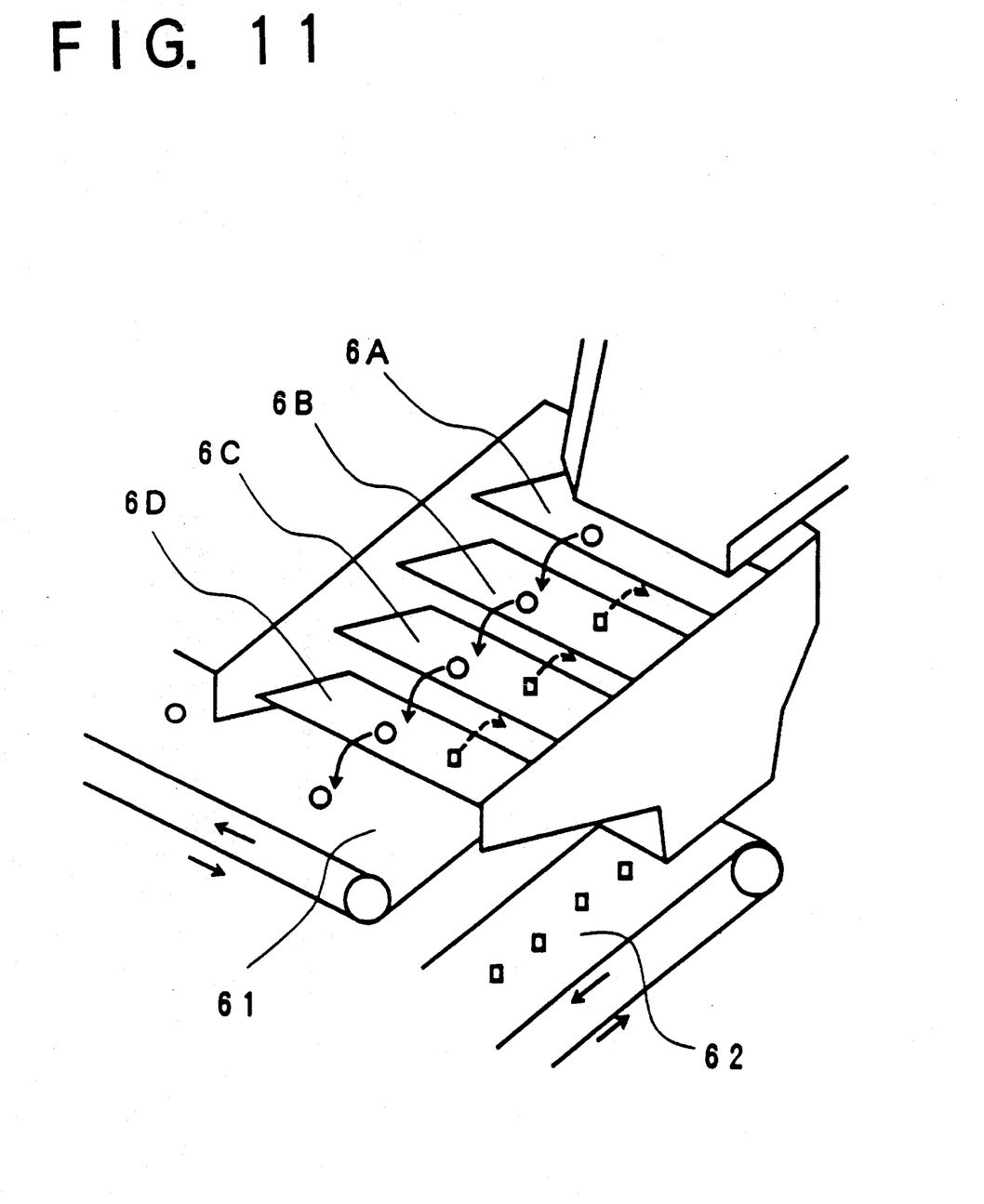
FIG. 11 is a perspective view showing the elastic substance removing device of the nonferrous material sorting apparatus as the third preferred embodiment of the present invention.

As shown in FIGS. 10 and 11, the elastic substance removing device 6 is composed of four inclined rectangular plates 6A to 6D respectively fixed at both ends to the side wall at different angles and arranged in parallel to be applied with the vibration upwards in the inclined direction. The elastic substance removing device 6 is constituted to make it possible that when the screened materials of not less than 12 mm are supplied from the first screening device 1, the rubber-like elastic substance (indicated by dots in FIG. 11) such as rubber and urethane gets over the inclined rectangular plates 6A to 6D due to the elasticity and frictional coefficient and reaches a conveyer 61 for discharging the rubber-like substance as shown by solid arrows in FIG. 11, while the metal materials (indicated by squares in FIG. 11) are dropped due to the inclination of the inclined rectangular plates 6A to 6D without getting over the rectangular plates 6A to 6D as shown by broken arrows in FIG. 11, and then supplied to the second screening device 3 through a conveyer 62 communicating to the second screening device 3.

The nonferrous material sorting apparatus as the third preferred embodiment constituted as described above makes it possible to remove rubber, urethane or the like so as to get over a plurality of inclined rectangular plates 6A to 6D one by one due to the vibration of the inclined rectangular plates 6A to 6D of the elastic substance removing device 6, while supplying the materials other than rubber, urethane or the like to the second screening device 3 for screening.

The preferred embodiments described above are illustrative and not restrictive, and it is to be understood that other embodiments and modifications are possible without departing from the technical concept of the invention which will be recognized by those skilled in the art on the basis of the claims, the description of the invention and the drawings.

What is claimed is:

1. A nonferrous material sorting apparatus, comprising:

a first screening device for screening materials of not more than a minimum reference size;

a first sorting device for sorting the materials, which are not more than the minimum reference size and screened by the first screening device, according to a weight ratio by employing an inclined vibrating table supplied with air;

a second screening device for screening the materials screened by the first screening device and larger than the minimum reference size into materials of at least two kinds of reference sizes larger than said minimum reference size; and a second sorting device including a fluidized bed for sorting the materials screened by the second screening device by adding solid constituent materials to said materials screened by the second screening device and sorting according to whether or not a specific gravity of the screened materials is large relative to that of said solid constituent materials of said fluidized bed.

2. A nonferrous material sorting apparatus according to claim 1, further comprising:

a conductive metal sorting device for sorting out conductive metal from the materials sorted by said first and second sorting devices using repulsive force based on an alternating magnetic field of a magnet rotor provided with a magnet.

3. A nonferrous material sorting apparatus according to claim 1, further comprising:

an elastic substance removing device for removing rubber-like elastic materials from the materials screened by said first screening device, while making use of the elasticity and frictional coefficient of the rubber-like elastic materials by applying vibration to said screened materials.

4. A nonferrous material sorting apparatus according to claim 1, wherein said first screening device comprises a first trommel constituted by a rotationally-driven hollow cylindrical body being arranged with an inclination to a horizontal plane and having a side wall provided with a large number of holes for allowing the materials of not more than the minimum reference size to pass through, and a plurality of rectangular scrapers arranged on an inside wall surface at a certain angle and provided in the axial direction.

5. A nonferrous material sorting apparatus according to claim 4, wherein said first screening device is additionally provided with at least one inclined scraper having an L-shaped section and arranged on the inside wall surface of said hollow cylindrical body with an inclination with respect to the axial direction so as to lower an outlet side.

6. A nonferrous material sorting apparatus according to claim 1, wherein said first sorting device comprises an air table constituted by a frame body supported at both ends by coil springs and provided with upper and lower screens being arranged at upper and lower portions and constituting a rectifying lattice having a large number of rectangular holes for rectifying the air supplied from an air blower, said air table being applied with the reciprocating vibration by a vibrating mechanism in the longitudinal direction, that is the inclined direction of the frame body, and constituted such that a substance having a small specific gravity located to an upper portion is moved downwards, while a substance having a large specific gravity located to a lower portion is moved upwards due to the reciprocating vibration.

7. A nonferrous material sorting apparatus according to claim 6, wherein said first sorting device is additionally provided with an inclination adjuster for adjusting the inclination angle of the air table by adjusting the vertical position of one end of the frame body constituting said air table.

8. A nonferrous material sorting apparatus according to claim 1, wherein said second screening device comprises a second trommel constituted by a rotationally-driven hollow cylindrical body arranged with an inclination to a horizontal plane and provided with a first area formed on the upper side wall and having a large number of holes of the size enough to allow the materials larger than the minimum reference in size in said first screening device to pass through, a second area formed on the side wall lower than said first area and having a large number of holes of the size larger than that of the holes in said first area, and a plurality of rectangular scrapers arranged on the inside wall surface at a certain angle in the axial direction.

9. A nonferrous material sorting apparatus according to claim 8, wherein each of the scrapers formed in said second trommel constituting said second screening device is arranged to be doglegged in a portion lower than the second area.

10. A nonferrous material sorting apparatus according to claim 1, wherein said second sorting device comprises a first dry fluidized bed sorting device constituted such that nonferrous materials passed through holes formed in a first area of said second screening device are mixed with sand constituting a fluidized bed used as circulating media, and the resultant mixture is separated by an eccentrically-moved sorting deck into either deposits or flotages according to whether or not specific gravity of said materials is large relative to that of the sand constituting said fluidized bed.

11. A nonferrous material sorting apparatus according to claim 10, wherein said second sorting device comprises a second dry fluidized bed sorting device constituted such that the nonferrous materials passed through the large number of holes formed in a second area of said second screening device are mixed with converter air-crushed slag constituting the fluidized bed used as circulating media, and the resultant mixture is separated by an eccentrically-moved sorting deck into either deposits or flotages according to whether or not specific gravity of said materials is large relative to that of the converter air-crushed slag constituting said fluidized bed.

12. A nonferrous material sorting apparatus according to claim 10, wherein said first dry fluidized bed sorting device has a large number of separation promoting pieces planted on the bottom of said sorting deck and composed of doglegged members bent to the downstream side.

13. A nonferrous material sorting apparatus according to claim 2, wherein said conductive metal sorting device comprises an eddy-current sorting device constituted by a magnet rotor arranged to be coaxial with a rotor for a belt conveyer and having alternately-arranged N and S poles of a rare earth magnet, said eddy-current sorting device being constituted such that the conductive metal is sorted from the materials supplied through the belt conveyer by sending the conductive metal away using the repulsive force of a repulsive field caused by eddy current generated in the conductive metal based on the alternating magnetic field of the magnet rotor.

14. A nonferrous material sorting apparatus according to claim 13, wherein the magnet rotor constituting said eddy-current sorting device is controlled so as to rotate in the same direction as the rotary direction of the rotor for the belt conveyer.

15. A nonferrous material sorting apparatus according to claim 13, wherein the magnet rotor constituting said eddy-current sorting device is controlled so as to rotate in the reverse direction to the rotary direction of the rotor for the belt conveyer.

16. A nonferrous material sorting apparatus according to claim 13, further comprising:

a rotary magnet device arranged between said second sorting device and said eddy-current sorting device and for sorting out magnetic materials from the materials mainly consisting of aluminum, glass or the like sorted by said second sorting device, while supplying the unsorted materials to the eddy-current sorting device.

17. A nonferrous material sorting apparatus according to claim 3, wherein said elastic substance removing device comprises an inclined vibrating device constituted by inclined vibrating plates applied with the vibration upwards in the approximately inclined direction, said inclined vibrating device being constituted such that a rubber-like elastic substance such as rubber and urethane rolls on the vibrating plates, to ascend upwards, due to the frictional coefficient of the rubber-like elastic substance and the vibration of the vibrating plates, while the other materials descend in accordance with the inclination of the vibration plates.

18. A nonferrous material sorting apparatus according to claim 17, wherein said inclined vibrating device is constituted by a plurality of rectangular vibrating plates having different inclination angles and arranged in parallel.

19. A nonferrous material sorting apparatus according to claim 9, further comprising:

a sorting device for sorting the materials to be sorted of a largest size, which are discharged from the doglegged portions of the scrapers arranged on the second trommel of said second screening device, according to the color and weight of the materials.

20. A nonferrous material sorting apparatus according to claim 1:

wherein, said first sorting device comprises an air table comprising said inclined vibrating table and having a rectifying lattice for rectifying air; and wherein, a substance having a small specific gravity located at an upper portion of the inclined vibrating table is moved downwards, while a substance having a large specific gravity located to a lower portion of the inclined vibrating table is moved upwards due to a reciprocating vibration of said inclined vibrating table.

21. A nonferrous material sorting apparatus according to claim 20, wherein said second sorting device comprises a dry fluidized bed sorting device for separating the screened material into either deposits or flotages within said solid constituent materials as said fluidized bed in response to said relative specific gravity of the material with respect to said solid constituent materials.

* * * * *